United States Patent [19]

Doliber

[11] 4,417,814

[45] Nov. 29, 1983

[54] NIGHT SIGHT WITH ILLUMINATED AIMING POINT

[75] Inventor: Darrel Doliber, Tempe, Ariz.

[73] Assignee: Litton Systems, Inc., Beverly Hills, Calif.

[21] Appl. No.: 190,007

[22] Filed: Sep. 23, 1980

[51] Int. Cl.³ .................. G02B 23/10; G02B 27/34
[52] U.S. Cl. .................................. 356/252; 250/333
[58] Field of Search .................. 356/247, 251, 252; 250/333; 350/10, 566, 567

[56] References Cited

U.S. PATENT DOCUMENTS

| | | | |
|---|---|---|---|
| 3,672,782 | 6/1972 | Akin, Jr. | 356/10 |
| 3,712,702 | 1/1973 | Schmidt | 350/10 |
| 3,951,553 | 4/1976 | Oberheuser | 356/251 |
| 3,994,597 | 11/1976 | Calder et al. | 356/252 |

Primary Examiner—Vincent P. McGraw
Attorney, Agent, or Firm—Gerald L. Cline

[57] ABSTRACT

There is disclosed a weapon sight for night time use having an image intensifier tube and an illuminated aiming dot. A front lens forms an image of a dimly lit scene onto the input surface of an image intensifier tube. A resulting intensified image is displayed at an output surface of the tube. A rear lens then projects this image to a viewer. A light source illuminates an aiming dot which is optically relayed by a beam combiner mirror through the rear lens to the viewer so that the images of the aiming dot and scene are superimposed. Mechanical means are provided for moving the aiming dot in elevation and windage.

In a specific embodiment of the invention, the light source is a light emitting diode (LED) which illuminates an input end of a short length of fine diameter optical fiber, the output end of which forms the aiming dot. Alternatively, the aiming dot can be a small aperture within an opaque disk mounted adjacent the LED. The red color of the output light of the LED is selected to contrast with the yellow-green color of the intensifier tube output image. The viewer thus sees a small, brightly illuminated high color contrast red aiming point against the yellow-green image of the viewed scene.

13 Claims, 5 Drawing Figures

NIGHT SIGHT WITH ILLUMINATED AIMING POINT

TECHNICAL FIELD

This invention relates generally to sighting devices and in particular to sighting devices for night time use.

BACKGROUND ART

Night sights of the type in which an image of a dimly lit, viewed scene is intensified by an electron optical image intensifier tube can use an aiming reticle which appears in the field of view. The reticle can be of either the silhouette or illuminated type.

In the silhouette type, an opaque marking on a reticle appears as a dark mark against the scene background. The problem with this type is that, unless the scene is bright or the mark is so large that it obscures a significant part of the view, the mark can be very difficult to see.

Illuminated reticles comprise marks on a reticle which are illuminated by an internal light source and can therefore be made much smaller than the silhouette type. U.S. Pat. No. 3,960,453 issued to S. T. A. Svensson et al. discloses a conventional daylight telescope having a row of light emitting diodes (LED's) which are projected into the field of view of the telescope to provide a moving light spot, the speed of which is adjusted to follow a moving target. While suitable for the purpose of providing a moving reference, the emitting area of each diode is too large to provide a desirably small aiming dot.

Another type of conventional illuminated reticle for a daysight includes a finely marked reticle which is illuminated by an internal light source. Such fine marks appear relatively dim against bright backgrounds which frequently appear in night sights.

Other illuminated reticle devices for daylight sights of the types disclosed in U.S. Pat. No. 3,320,671 to G. E. Rickert et al., and U.S. Pat. No. 3,645,635 issued to W. F. Steck use as reticles materials which fluoresce under ambient daylight and which obviously cannot be used in night sights.

SUMMARY OF THE INVENTION

Accordingly, it is an object of the present invention to provide a novel and improved weapons sight for night time use having an image intensifier tube and an aiming dot of a contrasting color to the color of an intensified image of a viewed scene.

Another object of the present invention is to provide such a night sight having a small brightly illuminated aiming dot which can be easily seen for quickly and accurately aiming a gun.

Yet another object is to provide such a device in which the aiming dot is easily discernable against background target images having wide ranges of brightness.

These and other objects and advantages are accomplished in a night sight having an illuminated aiming dot. A front lens forms an image of a dimly lit scene onto the input surface of an image intensifier tube. A resulting intensified image is displayed at an output surface of the tube. A rear lens then projects this intensified image to a viewer.

A light source illuminates an aiming dot which is optically relayed by a beam combiner mirror along an optical axis through the rear lens to the viewer so that the images of the aiming dot and scene are superimposed. Mechanical means are provided for moving the aiming dot in elevation and windage.

In a specific embodiment of the invention, the light source is a light emitting diode (LED) which illuminates an input end of a short length of fine diameter optical fiber, the output end of which forms the aiming dot. Alternatively, the aiming dot can be a small aperture within a opaque disk mounted adjacent the LED. The red color of the output light of the LED is selected to contrast with the yellow-green color of the intensifier tube output image. The beam combiner mirror is dichroic and transmits a maximum of the yellow-green color light from the output image and reflects a maximum of the red light from the aiming point. The viewer thus sees a small, bright, high color contrast red aiming point against the yellow-green image of the viewed scene.

BRIEF DESCRIPTION OF THE DRAWINGS

These and other objects, advantages and features will become more fully apparent from the following detailed description of the invention when considered in conjunction with the accompanying drawings, wherein like numbers refer to like parts throughout and in which:

FIG. 5 is an alternative embodiment of an aiming dot.

DETAILED DESCRIPTION OF THE DRAWINGS

Figure 1:
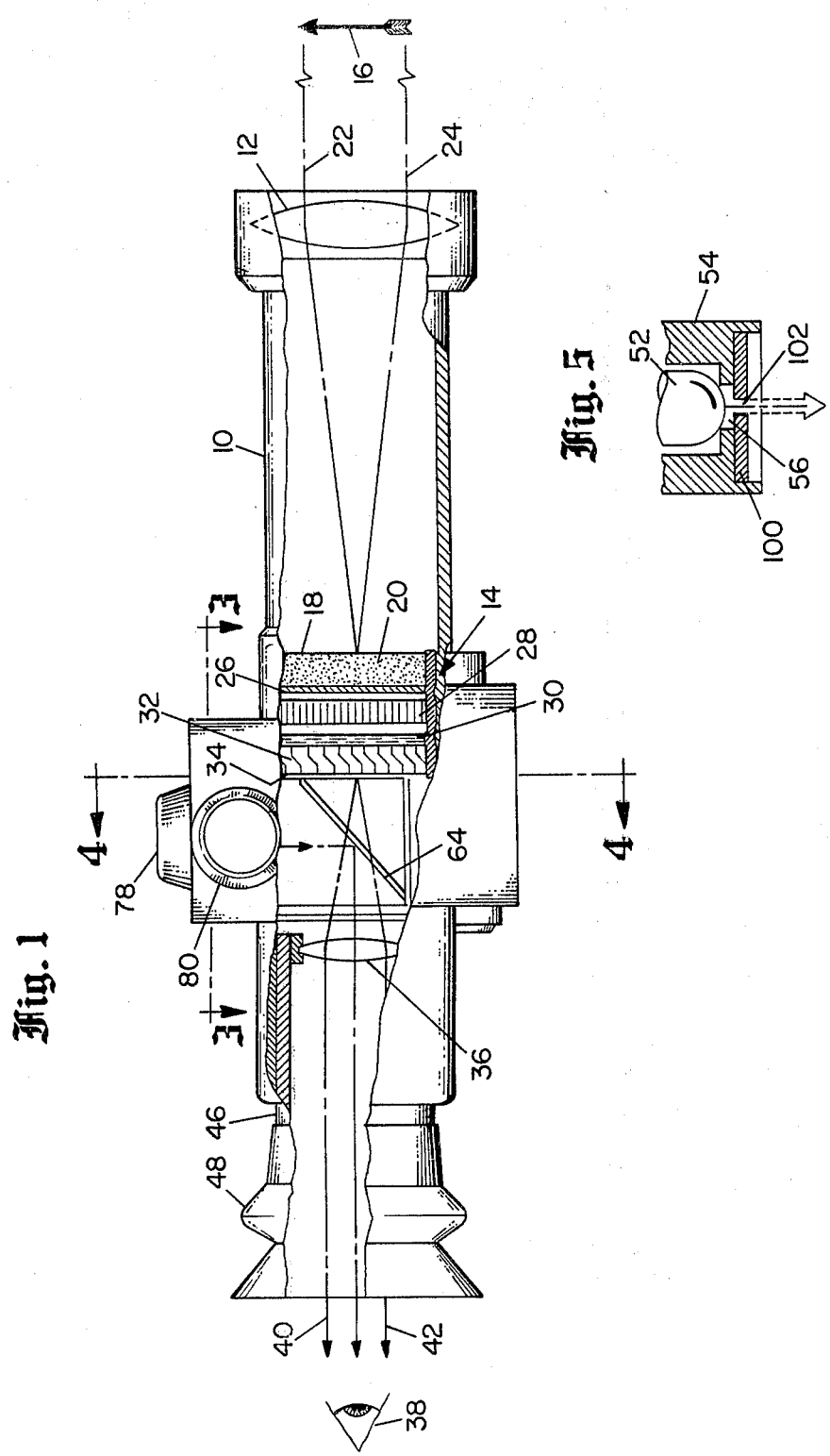
FIG. 1 is a side view of the night sight according to the invention with portions shown in cross-section.

Referring with particularity to FIG. 1, a housing 10 holds an objective lens 12 of high light gathering power and an image intensifier tube 14. An image of the scene 16 in front of the lens 12 is formed on the front or image input surface 18 of input fiberoptic plate 20 included in tube 14. Light rays 22 and 24 show how light from the viewed scene 16 is focussed by lens 12 onto the input surface 18 of the image intensifier tube 14. The fiberoptic plate 20 is comprised of a bundle of thin optical fibers whose ends form the front and rear bounding surfaces of the plate. Each of the optical fibers passes one element of the image formed on the input surface 18 to a photocathode 26 deposited on the rear surface of the fiberoptic plate 20. The resulting image formed on photocathode 26 is therefore a mosaic of such elements. Each of the fibers is sufficiently small so as not to limit the spatial resolution of the image intensifier tube 14.

The photocathode 26 is a photosensitive surface that emits electrons in a spatial pattern corresponding to the intensity of the optical image formed upon it by objective lens 12. A suitable photocathode material is produced by evaporating in vacuum a combination of the alkali metals potassium, sodium, antimony, and cesium and depositing them on a suitable transparent substrate. This process yields a photocathode with a sensitivity from the visible into the near-infrared spectral regions.

The electrons emitted from photocathode 26 impinge on the input surface of a microchannel plate 28 which multiplies them by thousands of times through the process of cascaded secondary emission. The multichannel plate 28 consists of millions of microscopic hollow-glass electron conducting channels fused into a disk-shaped array. The walls of these channels are specially processed to produce secondary electrons. Voltage is applied across the disk faces so that each microscopic channel represents a separate, high gain electron multiplier. The voltage supply is a battery, not shown, mounted within a receptacle in housing 10. When an electron impinges upon the input surface of the channel plate 28, secondary electrons are generated. The secondary electrons are accelerated through the channels by the applied voltage, colliding with the channel surfaces to dislodge additional secondary electrons, thereby producing electron multiplication. By varying the voltage across the disk, the gain of the multiplier can be controlled. These electrons, now increased in number and energy, impinge on a phosphor screen 30 deposited on the front surface of an fiberoptic output plate 32. The phosphor is suitably a yellow-green phosphor having a spectral emission centered around 550 nanometers. As in the input fiberoptic plate 20, the output fiberoptic plate 32 is also comprised of a bundle of optical fibers which relays the image to a back or output face 34 of fiberoptic plate 32; however, the bundle is constructed with a 180 degree twist in order to invert the otherwise upside down image produced by the objective lens 12.

An image intensifier tube 14 of the type described is produced by the Litton Electron Tube Division of Litton Systems, Inc., Tempe, Ariz. As Image Intensifier Tube Model L-4261.

Other known types of image intensifier tubes having construction different from what is described above can be substituted for the one described and are available from a number of commercial sources.

The intensified image of the field of view formed at the output surface 34 of fiberoptic plate 32 is projected by eye piece lens 36 to the eye 38 of a viewer as shown by light rays 40 and 42.

Eyepiece lens 36 is mounted in an eyepiece tube 46 which threads into the back end of housing 10 so as to be movable along its longitudinal axis for focussing onto the image at output surface 34. A flexible eyecup 48 attached to the rear end of tube 46 fits against the viewer's eye 38 to shield it from external light and to reduce illumination of the viewer's face. the eyepiece lens 36 has a long eye relief and large exit pupil so that a viewer wearing corrective eyeglasses need not press their face against the eyecup 48.

Figure 2:
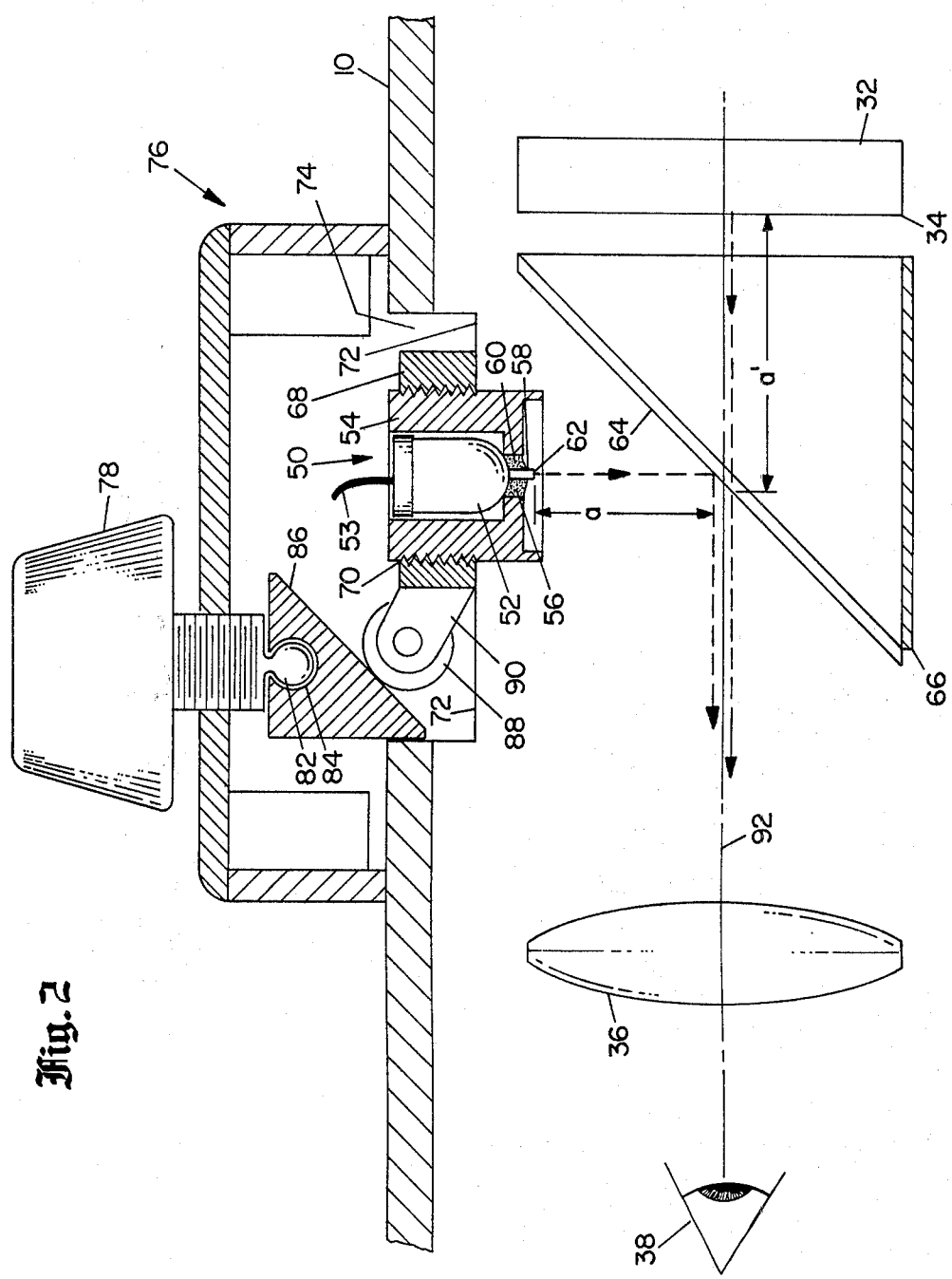
FIG. 2 is a detailed cross-sectional side view of FIG. 1.

Referring now to FIG. 2, a key feature of the invention is a light source 50 for producing an aiming dot. As will be described in detail later, light source 50, hence the aiming dot, is movable with respect to housing 10. The reason that it must be movable is that housing 10 becomes rigidly fixed to a weapon (not shown). Light source 50 comprises a light emitting diode (LED) 52 recessed into the upper end of the cylindrically shaped LED holder 54. At the lower end of holder 54 is a recessed aperture 56 whose upper end communicates to the output end of the LED. Within aperture 56, an optical fiber 58 is held vertically in place by an opaque bonding adhesive 60 which fills the remaining cross-sectional area of the aperture 56. The upper end of optical fiber 58 abuts the LED 52 causing the light output from the LED to be directed down the length of the optical fiber 58.

Thus illuminated, the lower or output end 62 of optical fiber 58 is also an aiming dot because it forms a bright dot which, as will be described, is imaged into the viewer's field of view. The diameter of the fiber 58 is preferably quite small, in the range from 0.0003 to 0.010 inches in diameter, so as to provide an aiming dot which does not obscure even small targets.

The LED 52 is selected to emit in a color, such as red, which contrasts with the yellow-green color of the output image formed by image intensifier tube 14. An intensity control, not shown, is used to adjust the intensity of the LED output and thereby of the aiming dot to optimize brightness contrast and minimize optical flare. The LED is connected by leads 53 to the same battery used for the image tube 14. Among the advantages of an LED over conventional incandescent sources are its small size, high brightness, and low power drain.

Light leaving the output end 62 of fiber 58 is reflected from beam combiner mirror 64 which is tilted at substantially 45 degrees so as to direct the light along an optical path 92 passing through the eyepiece lens 36 and to the viewer's eye 38. Thus, the output end 62 is projected into the optical path and appears within the field of view as an aiming dot. The beam combiner mirror 64 is bonded to the slanted face of an obliquely cut tube 66 which is in turn rigidly fastened to housing 10.

The beam combiner mirror 64 is a wavelength selective (dichroic) mirror designed to transmit maximum light at the wavelength of the light from the image intensifier tube and to reflect maximum light at the wavelength of the light emitted by the light source. For example, with the above described image intensifier tube 14 having a yellow-green output image and an LED source 52 operating in the red spectral region, a typical beam combiner mirror 64 would transmit more than 90% of the green light and reflect greater than 90% of the red light. The mirror is made up of one or more dielectric layers coated onto a suitable transparent substrate. Such a beam combiner mirror 64 is well known in the art and is available from many commercial sources.

A source support block 68 includes a bore 70 into which is threaded source holder 54. Source holder 54 is rotated up and down in bore 70 until the viewer can simultaneously see both the images of the aiming dot 62 and the viewed scene 16 in simultaneous focus. This simultaneous focus condition occurs when the optical path lengths from beam combiner 66 to fiberoptic end 62, and from beam combiner 66 to image output surface 34, a and a' respectively, are approximately equal or in other words when the virtual image of optical fiber end 62 formed by lens 36 is located at output surface 34. Such an arrangement also eliminates the parallax between the aiming dot 62 and the viewed scene so that the viewer can move his eye without causing relative motion between the aiming dot and the scene. Once this proper focus is established by adjustment of the vertical height of holder 54 within bore 70, holder 54 is locked in vertical position by, for example, applying a liquid cement onto the threaded surfaces between holder 54 and bore 70.

Figure 3:
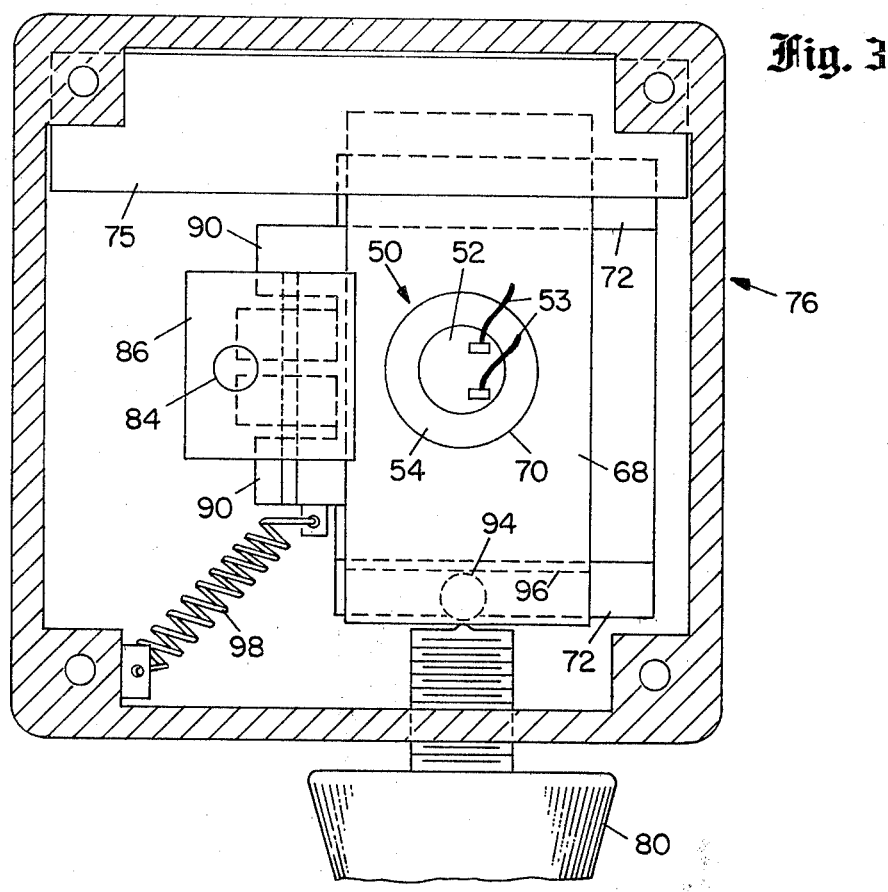
FIG. 3 is a sectional view taken along line 3—3 of FIG. 1.
Figure 4:
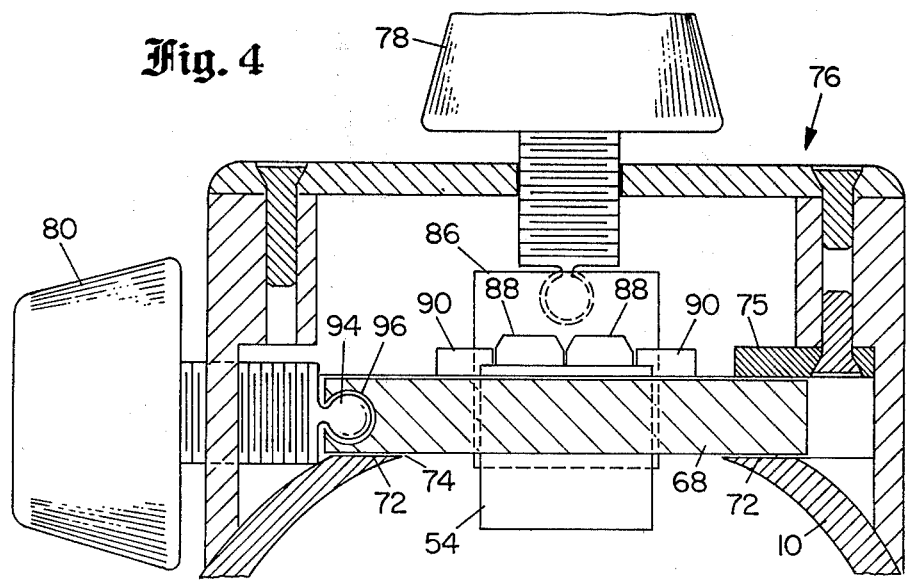
FIG. 4 is a cross-sectional view taken along line 4—4 of FIG. 1.

Referring now to FIGS. 2 thru 4, the configuration of the windage and elevation adjustment mechanisms are described. Source support block 68 has its ends resting on guide surfaces 72 formed by an opening 74 in the top of housing 10. Retaining plate 75 lightly holds support block 68 against guide surfaces 72. Both the housing 10 and support block 68 are suitably of aluminum with the support block 68 being hardened by anodization so as to slide without binding on guide surfaces 72. A small amount of lubricant such as silicone oil is applied to the area of surfaces 72 which come in sliding contact with support block 68 to ensure smooth sliding. Retaining plate 75 is preferably brass.

Enclosure 76 covers the windage and elevation adjustment mechanisms. Projecting from enclosure 76 are elevation adjustment knob 78 and windage adjustment knob 80, both of which are threaded thru the walls of enclosure 76. A spherical projection 82 on elevation knob 78 engages a socket 84 in a 45-degree wedge 86. Turning the elevation adjustment knob 78 raises or lowers the wedge 86 which in turn bears against a pair of cylindrical bearings 88 attached to a bracket 90 on block 68 so as to cause block 68 to move backwards and forwards a precisely controlled distance along the length of housing 10. Such a movement causes a corresponding vertical movement of the viewed image of the aiming dot formed by fiber end 62. With beam combiner 64 tilted at 45 degrees to the optical axis 92 of eyepiece lens 36 and the guide surfaces 72 oriented parallel to the same optical axis, the result is that the optical distance between aiming dot 62 and eye piece lens 36 remains constant as aiming dot 62 is moved by elevation adjustment knob 78. As thus becomes readily apparent, the viewed image of aiming dot 62 remains in focus during this motion.

Referring to FIGS. 3 and 4, it is seen that windage adjustment knob 80 has a spherical projection 94 which engages a socket 96 in support block 68. Turning the windage adjustment knob 80 causes the support block 68 to slide along guide surfaces 72 transversely to the length of housing 10, that is, in a direction perpendicular to the motion caused by the elevation knob, thereby moving the viewed image of aiming dot 62 to the left or right of the viewer. By controlled rotations of the elevation knob 78 and windage knob 80, the image aiming dot 62 can be superimposed on a target within the viewed scene 16.

As shown in FIG. 3 a coil spring 98 is attached by one of its ends to a corner region of enclosure 76 and by its other end to support block 68 so as to bias the block 68 against the windage adjustment knob 78 and wedge 86.

FIG. 5 is an alternative embodiment of an aiming dot in which the optical fiber has been replaced with an opaque disk 100 having an aperture 102. Disk 100 is mounted on the shoulder of recessed aperture 56. Aperture 102 illuminated by LED 52 to form an aiming dot which is projected into the field of view of image tube 14, in the previously described manner. As with the optical fiber, the diameter of the aperture 102 is preferably from 0.0003 to 0.010 inch. Such apertures are available through commercial suppliers of components used in the field of laser technology.

The compact size and light weight of the night sight makes it particularly suitable for use on a rifle for use at night. The small size of the aiming dot will not obscure the target upon which it is superimposed. Its brightness and contrasting color with the viewed scene makes it particularly suitable for fast, accurate aiming.

Although the present invention has been shown with reference to particular embodiments, many variations apparent to those of ordinary skill in the art may be made without departing from the spirit and scope of the present invention.

What is claimed is:

1. A night sight comprising:
   (a) an image intensifier tube having an image input surface and image output surface;
   (b) first lens means for imaging a viewed scene onto said input surface;
   (c) second lens means for projecting to a viewer an output image of said scene formed at said output surface;
   (d) means, including a light source, for providing an illuminated aiming mark;
   (e) beam combiner means for directing light from said aiming mark along an optical axis through said second lens means to said viewer so as to superimpose an image of said aiming mark onto said output image projected to said viewer;
   (f) a housing for mounting and protecting the other components of said nightsight; and
   (g) means for translating said image of said aiming mark in elevation and windage including
      (1) a light source support block for holding said aiming mark;
      (2) guide surfaces integral with said housing upon which said support block slides in one or the other of two mutually orthogonal directions;
      (3) means, including an elevation adjustment knob, for controllably moving said support block in one of said directions so that said image of said aiming mark seen by said viewer moves in a vertical direction; and
      (4) means, including a windage adjustment knob for controllably moving said support block in the other direction, so that said image of said aiming mark seen by said viewer moves in a horizontal direction.

2. The device of claim 1 wherein the color of the output light from said light source contrasts to the color of said output image formed by said intensifier tube.

3. The device of claim 1 wherein said light source is a light emitting diode (LED).

4. The device of claim 3 wherein said LED emits in the red wavelength region.

5. The device of claim 2 wherein said color of said output image is in the yellow-green wavelength region centered between 510 and 560 nanometers.

6. The device of claim 1 wherein said aiming mark comprises the output end of an optical fiber, said fiber having its input end optically coupled to said light source.

7. The device of claim 1 wherein said aiming mark is an aperture in an opaque disk.

8. The device of claim 1 wherein said aiming mark is a dot.

9. The device of claim 2 wherein said beam combiner means comprises a dichroic mirror transmitting maximum light transmittance at the wavelength of light from said output image and reflecting maximum light at the wavelength of light emitted by said light source.

10. The device of claim 1 wherein said image intensifier tube is of the type having a microchannel plate for electron multiplication.

11. The device of claim 1 wherein the respective positions of said aiming mark, said beam combiner means and said image output surface are such that a virtual image of said aiming mark formed by said second lens means is located at said output surface.

12. The device of claim 8 wherein said dot has a diameter in the range from 0.0003 to 0.010 inch.

13. A night sighting device for use with firearms or the like comprising:
   (a) an image intensifier tube having an image input surface and image output surface wherein said image intensifier tube is of the type having a microchannel plate for electron multiplication;

(b) first lens means for imaging a viewed scene onto said input surface;
(c) second lens means for projecting to a viewer an output image of said scene formed at said output surface;
(d) means, including a LED light source, for providing an illuminated aiming dot wherein the color of the output light from said light source contrasts to the color of said output image formed by said intensifier tube;
(e) a beam splitter for directing light from said aiming dot along an optical axis through said second lens means to said viewer so as to superimpose a virtual image of said aiming dot onto said output image projected to said viewer;
(f) a housing for mounting and protecting the other components of said sighting device;
(g) means for translating said aiming dot including:
  (i) source support block for holding said aiming dot;
  (ii) guide surfaces substantially integral with said housing upon which said support block slides parallel and perpendicular to the length of said housing;
  (iii) means, including an elevation adjustment knob, for controllably moving said support block in said parallel direction so that said image of said aiming dot seen by said viewer moves in a vertical direction; and
  (iv) means, including a windage adjustment knob, for controllably moving said support block in said perendicular direction so that said image of said aiming dot moves in a horizontal direction.

* * * * *